United States Patent [19]

Serocki et al.

[11] Patent Number: 5,074,072
[45] Date of Patent: Dec. 24, 1991

[54] FOLDING TIP-UP

[76] Inventors: Richard R. Serocki, Rte. 1, Box 332; William D. Appel, Rte. 1, Box 149, both of Browns Valley, Minn. 56219

[21] Appl. No.: 678,643

[22] Filed: Apr. 1, 1991

[51] Int. Cl.⁵ ............................................. A01K 93/00
[52] U.S. Cl. ........................................ 43/17; 43/17.1; 43/16
[58] Field of Search ................ 43/17, 17.1, 17.2, 17.5, 43/16

[56] References Cited

U.S. PATENT DOCUMENTS

| | | | |
|---|---|---|---|
| 3,134,188 | 5/1964 | Peterson | 43/17 |
| 4,030,223 | 6/1977 | Loesch et al. | 43/17 |
| 4,120,111 | 10/1978 | Young, Jr. | 43/17 |
| 4,571,876 | 2/1986 | LeClair | 43/17 |
| 4,621,446 | 11/1986 | Anderson | 43/17 |
| 4,780,979 | 11/1988 | Dyck et al. | 43/17 |

Primary Examiner—Richard K. Seidel
Assistant Examiner—Chuck Y. Mah
Attorney, Agent, or Firm—D. L. Tschida

[57] ABSTRACT

Fish bite signaling apparatus having a base shaped to cover an ice hole and including a hinged vertical handle which supports a fish line containing reel. A spring biased signaling flap projects from the base, magnetically interconnects with a number of magnets mounted to the reel and cooperates with separate visual and audio annunciation means. Line tensioning means and accessory support means are also provided.

17 Claims, 4 Drawing Sheets

FOLDING TIP-UP

BACKGROUND OF THE INVENTION

The present invention relates to a fish bite signaling means and, in particular, to apparatus compatible with ice fishing.

A popular winter activity for fisherman residing in the northern tier states, where lakes ice over during the winter months, is the sport of ice fishing. This activity can be pursued with either a fishing line or spear. Most typically, once a hole is prepared through the ice covering, the fisherman suspends a bait or lure to attract and entice a prey fish to appropriately present itself and ingest the bait and a hidden hook.

While hand lines or a variety of rod and reel combinations can be used to present the bait, numerous devices or so called "tip-ups" have been developed. A tip-up supports a line containing reel in stationary relation to an ice hole to indicate a bite to the angler via the extraction of line from the reel. The angler meanwhile may be more comfortably positioned within an adjacent vehicle, ice house or other shelter. Depending upon user preference, the reel and line may be submerged or alternately supported above the ice in either an exposed or a protected fashion relative to environmental influences.

Of the exposed type of assemblies, problems often arise from difficulties in dismantling or erecting the assembly; to having the hole freeze and trap the line; to having the reel or flag freeze with drifting/blowing snow; to not being able to see the bite indicator under low light conditions. It is with many of these latter considerations in mind that the present assembly was developed.

As regards prior assemblies of which Applicants are aware, U.S. Pat. Nos. 4,246,716; 4,285,154; and 4,030,223, disclose submersible spool assemblies. The 4,246,716 assembly includes a metal tab which is tied to the fishline and cooperates with an annunciator means including audible and visible bite alarms. U.S. Pat. No. 4,030,223 shows an assembly including a magnetically biased signaling arm.

Other assemblies which include a hole cover mechanism are shown in U.S. Pat. Nos. 4,621,446; 4,685,240; 4,787,166; 4,780,979; 4,823,494; and 4,862,627. A variety of spooled line containers and bite indicator means are included with the hole cover mechanisms. The spooled line holders are variously mounted in parallel or perpendicular relation to the base.

Where mounted in perpendicular relation to the base, such as in the U.S. Pat. Nos. 4,621,446; 4,787,166 and 4,780,979 assemblies, a rigid vertical wall is typically provided and the spooled line container is rotatively mounted to the wall. The line is tangentially suspended from the reel into the fish hole. Line supports, in turn, are variously secured to the base and/or vertical wall to cooperate with a mechanical linkage that interconnects with a flag member to release the flag and indicate a bite with line movement.

Applicants believe an assembly which provides an edge mounted spooled reel that tangentially supports the line in the hole is preferable to other assemblies. However, the vertically supported spool presents difficulties for storage and transport of multiple tip-up assemblies. That is, the relatively high profile presented by the spool, unless a small diameter spool is used, minimizes the numbers of units which can be readily carried by the fisherman. The use of mechanical connections to the flag signaling members also present potential problems should drifting snow or consequent ice restrict movement at the pivot points of their linkages.

In appreciation of the foregoing problems, Applicants have developed an improved tip-up assembly which overcomes many difficiencies of prior art tip-ups.

SUMMARY OF THE INVENTION

It is accordingly a primary object of the present invention to provide a bite signaling assembly which is compatible with ice fishing conditions.

It is a further object of the invention to provide an assembly which supports a spooled fish line in a vertical, on-edge mounting position to a fish hole and wherefrom a fish line is tangentially suspended, yet which disassembles or folds to a relatively shallow profile for transport.

It is a further object of the invention to provide a spool having a circumference of approximately one foot, thereby facilitating depth adjustments at initial setup.

It is a further object of the invention to provide magnetically coupled bite signaling means.

It is a further object of the invention to provide an assembly including a support base which covers the ice hole and includes a hinged, spooled line support wherein the support may be readily detached from the base.

It is a further object of the invention to provide illuminated bite indicator means and adjustable line tensioning means.

It is a yet further object of the invention to provide an assembly which supports various accessory items about the assembly for storage.

Various of the foregoing objects and advantages of the invention are particularly achieved in a presently preferred construction which comprises a disk-like base member that contains a hinged, spool support arm that perpendicularly projects therefrom. The arm presents an arcuate shape to serve as a carry handle and couples to hinge projections extending from the base to fold between vertical and parallel orientations to the base. The arm rotatively supports a spooled reel of line of an approximate one foot circumference which contains a finger hole. One or more coupler portions of the arm mate with the base projections to provide a detachable mounting of the arm to the base. A spring biases the arm and reel into upright relation to the base, yet which arm and reel can be folded into parallel relation to the base, along with a spring mounted flag indicator.

Tensioning means secure the reel to the support arm and permit adjustment of the line release tension. A plurality of magnets secured to the face of the reel cooperate with a spring metal signaling arm to release a visual flag indicator upon rotation of the reel. Visual indicators may also be mounted to the exposed reel surfaces. An associated annunciator means including audible and illuminated indicators is coupled to the flag movement to further signal a detected bite. Sundry supports coupled to the base and arm or a covered tackle compartment support accessory items, such as depth measuring weights, extra hooks or lures.

Still other objects, advantages and distinctions of the invention are described below. Attention is accordingly directed to the following detailed description of the invention with respect to the appended drawings. Various presently considered constructions of the invention are particularly described, along with considered modifications and improvements thereto. The following description is however intended to be illustrative only of presently considered features of the invention and should not be interpreted in strict limitation thereto. Rather, the scope of the invention should be interpreted from the following appended claims.

DESCRIPTION OF THE PREFERRED EMBODIMENT

Figure 1:
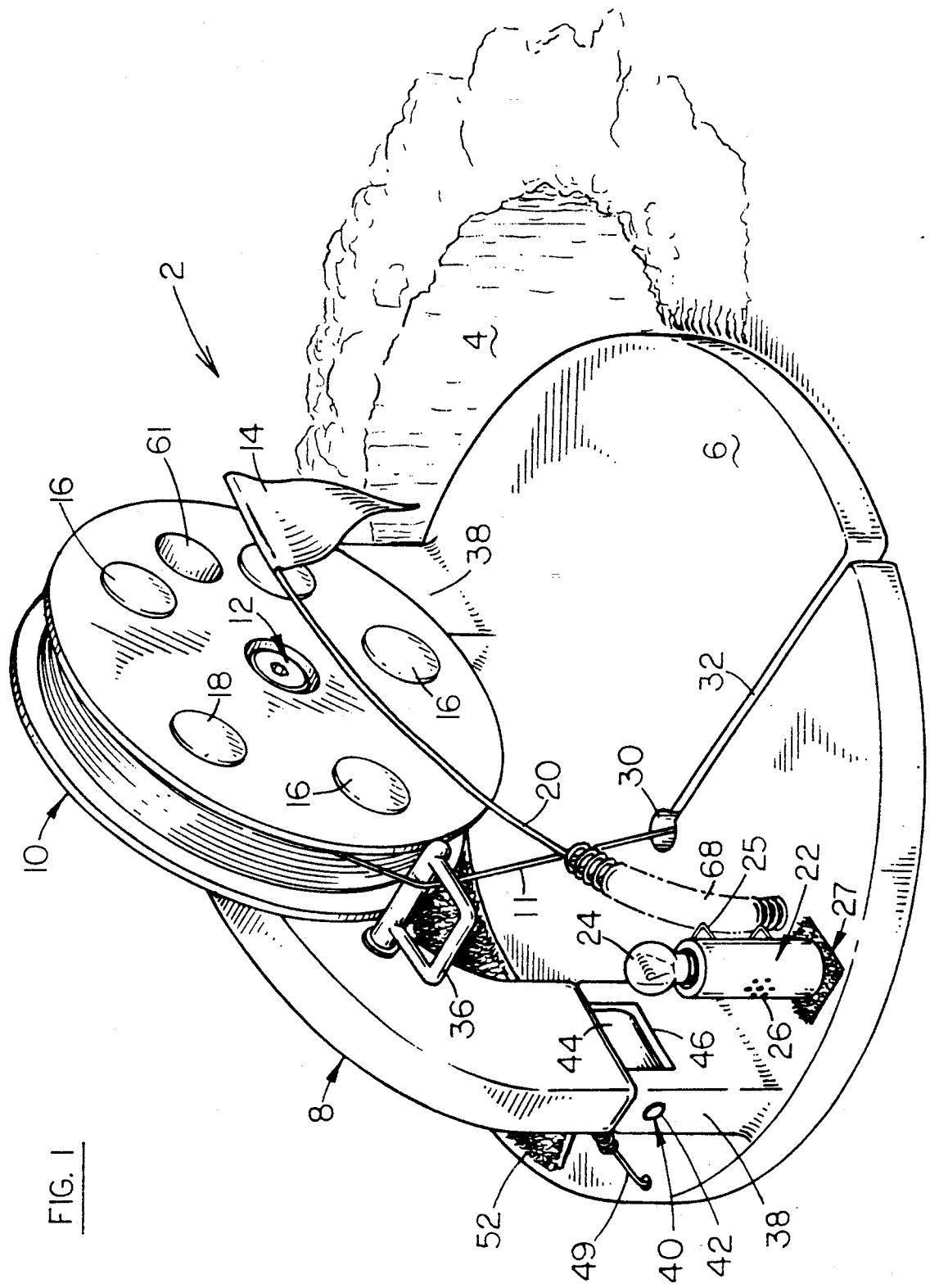
FIG. 1 shows an assembled perspective drawing of the invention as it appears in normal use relative to an ice hole.

Referring to FIG. 1, a perspective drawing is shown of the tip-up assembly 2 of the present invention as it typically appears in relation to a fish hole 4 formed in the frozen surface of a lake, stream or river. The assembly 2 generally comprises a mechanism including a circular disk or support base 6 which covers the hole 4 and from which a support arm 8 perpendicularly projects. The arm 8 supports a spooled reel 10 of fish line 11 at an axle pivot which forms a part of a line tension adjusting assembly 12 secured between the spool 10 and arm 8 (reference FIG. 3). A flag indicator 14 magnetically couples to one or more magnets 16 secured to the forward surface of the spool 10. Reflective or colored spots 18 can be secured to the reel face to show rotation of the spool 10.

A fish bite is indicated via rotation of the spool 10. That is as line 11 is extracted by a fish which strikes a suspended bait, the spool 10 rotates and a spring arm 20 which supports the flag 14 is released. An adjacent battery powered annunciator assembly 22 is electrically coupled to the spring arm 20 to augment bite annunciation under varying fishing conditions. A light 24 and/or audible annunciator 26 are particularly provided. An associated on/off switch (not shown) or adjustable annunciator mounting assembly 27 permits a disabling of the annunciator 26. That is, the assembly 22 can be re-positioned or removed for transport so the electrical contacts 25 will not engage the spring arm 20.

Figure 2:
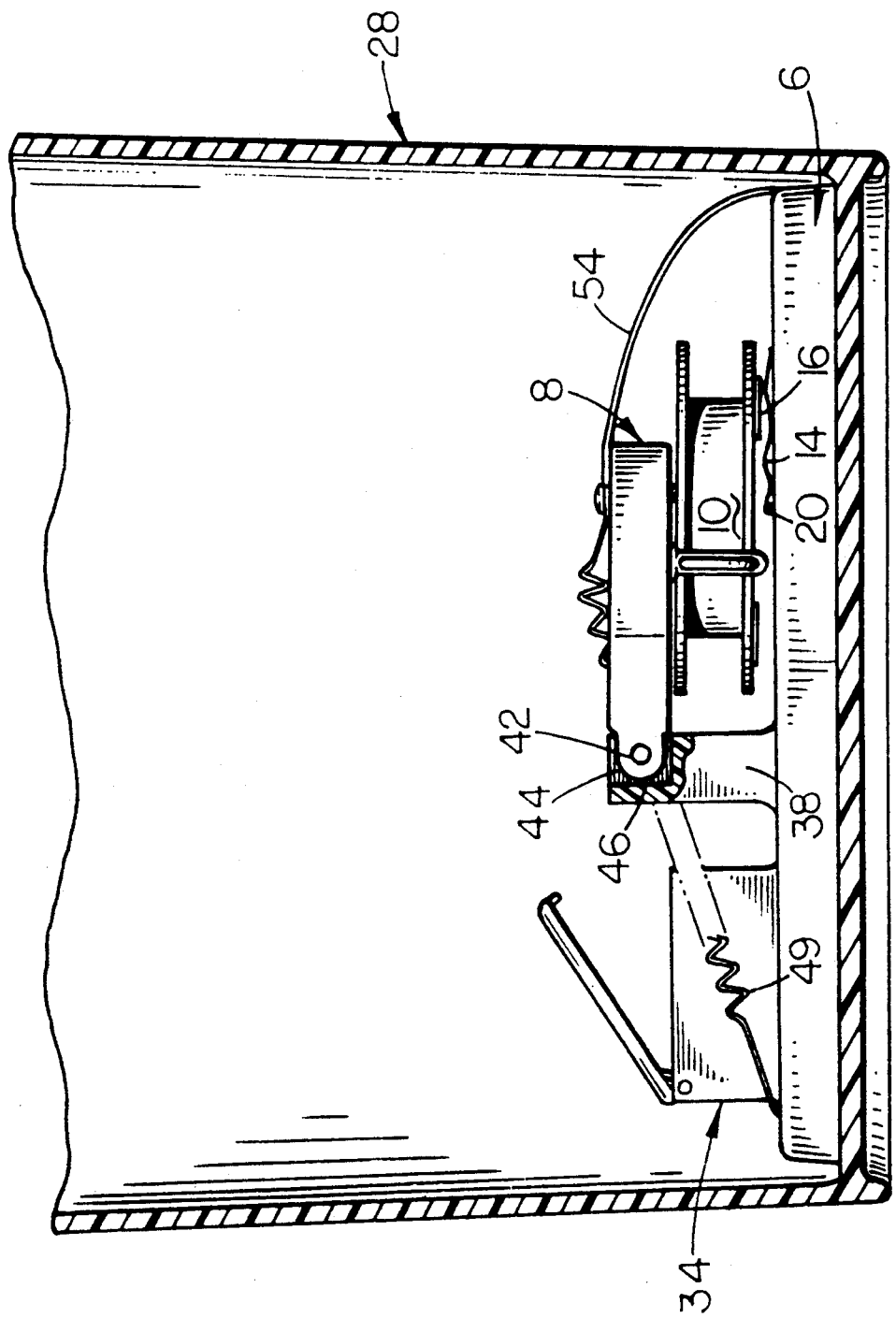
FIG. 2 is an elevation drawing of a modified construction of the invention when folded for transport.

The support base 6 is formed in the shape of a disk and has a diameter slightly larger than the typically encountered ice hole 4 (e.g. 6, 8, or 10 inches). The diameter is also sized to mount within the bottom of a five gallon bucket 28 such as is commonly used by ice fisherman for transporting equipment and as a seat. FIG. 2 shows such an arrangement. A line receiving hole 30 and slot 32 which extends from the hole to the outer periphery of the base, receive the suspended fish line 11 and supported bait or lure (not shown). The slot 32 may or may not be included, but facilitates the checking of a detected bite and/or re-bating of the hook. Also shown is a covered tackle container 34 which can be formed as a part of the base 6 or be separately secured to the base 6.

The base 6, arm 8 and spool 10 are preferably formed from an injection molded polypropylene plastic. Such a construction facilitates the fabrication and assembly of large numbers of the assemblies 2. It is to be appreciated, however, that a variety of other materials, such as wood, and/or other molding techniques can be employed, depending upon the material and cost, when further considered with the typically encountered conditions under which the assembly 2 is used. More of the details of the structural components of the assembly 2 will be described below.

Perpendicularly projecting from the support base 6 is the arcuate spool support arm 8. The arm 8 is positioned to one side of the center of the hole 30 and pivotally supports the spool 10 which contains a length of fish line 11. The line 11 tangentially projects from the spool 10 through an eyelet guide 36 which is pivotally secured to the arm 8. The eyelet 36 extends the approximate width of the spool 10 and prevents the line 11 from fouling with the spool 10.

Opposite ends of the arm 8 are coupled to mating projections or standoffs 38 which rise from the base 6. Hinge coupler assemblies 40 particularly secure each end of the arm 8 to the base projections 38. The details of the hinge mounting are particularly shown in FIGS. 2 and 3. Generally, however, a pair of hinge pins 42 mount to projections 44 which extend from the ends of the arm 8 and which mate with cavities 46 formed in the standoffs 38. It is to be appreciated though that a variety of hinge mechanisms or constructions can be used. For example, in lieu of a hinge pin 42, the projections 44 can be formed to snap couple to the projection 38, reference the assembly of FIG. 4. Alternatively, too, the length of the arm 8 can be adjusted to extend only partially across the base 6, thereby requiring only a single hinge assembly 40.

An arcuate shaped arm 8 provides advantage in that the arm 8 serves as a carry handle when positioning the assembly 2 or carrying the assembly 2 from one hole 4 to another. It is to be appreciated, however, that other shapes of planar members can support the spool 10 in hinged, on-edge relation to the base 6. A separately projecting hand-hold aperture can be let into such members. Alternatively, a separate carry handle may project from the hinged spool support 8, regardless of the shape.

Mounted to the rear surface of the arm 8 is a spring 49. The spring 49 biases the arm 8 upright and can be detachable from the arm 8, or not, to facilitate folding of the assembly 2. The spring 49 can also be deleted, if a tight interaction is provided at the hinge assembly 40 or if a latch (not shown) is provided at the hinge assembly 40 to retain the arm 8 upright. The assembly of FIG. 4 operates in this fashion.

Secured to the edge of the aft standoff 38 (reference FIG. 3) is a projection 50 which is used to retain various auxillary appliances. In particular, weights used to determine depth and other clip-on fishing accessories can be attached to the projection 50. A fabric or VELCRO or fabric pad 52 can be secured to the base 6 to support extra hooks, lures or the like during use. A tackle compartment 34 can also be attached to the pad 52, for example, if VELCRO type pad fasteners are used. The compartment 34 may also be molded as a part of the base 6.

FIG. 2 shows the assembly of FIG. 1 with the arm 8 folded to its travel position. When so positioned, the spool 10, which is approximately one inch thick, is contained in the space determined by the standoffs 38. The flag 14 is restrained beneath the arm 8. Where the annunciator assembly 22 is also used by the fisherman, it typically is removed during transport. Otherwise, a clip or strap fastener 54 may extend from the base 6 and attach to secure the arm 8 for transport. Such a fastener 54 finds particular advantage for an assembly 2 which includes a spring 49.

Figure 3:
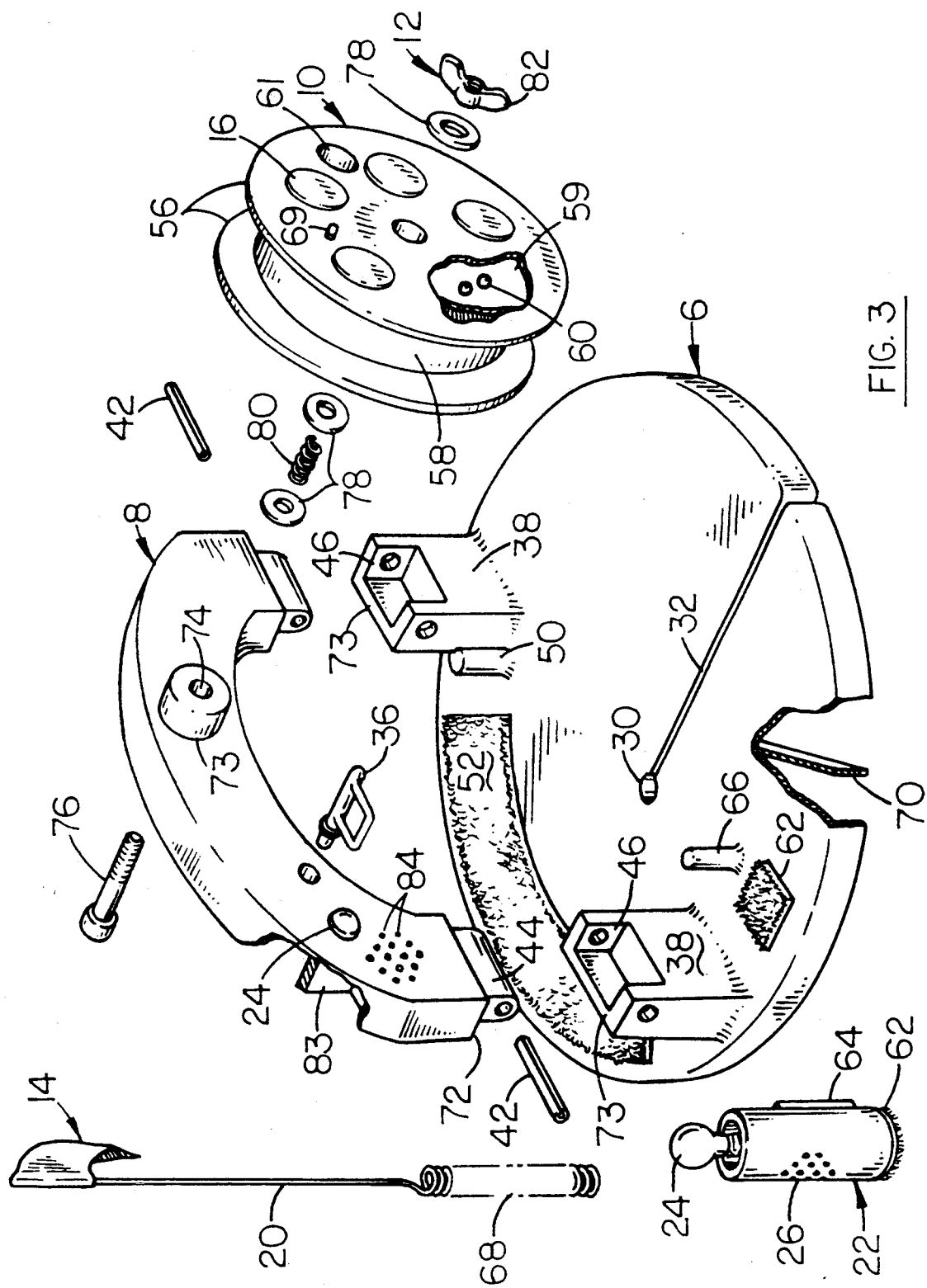
FIG. 3 is an exploded assembly drawing of the invention.

With additional reference to FIG. 3, the line containment spool 10 is otherwise formed with front and back relatively large diameter outer portions 56 which are spaced apart via a center core 58. The circumference of the core 58 is sized to contain approximately one foot of line for each revolution of the spool 10. The fisherman is thus able to regulate line release with some accuracy. In typical practice, the spool 10 is sized to contain approximately 200 feet of line. The body of the spool 10, as shown in FIG. 3, may include a hollow cavity 59 that supports a number of beads 60 to provide a "rattle" action with the rotation of the spool 10. A recess or finger cavity 61 is provided which facilitates winding the spool 10 in an appropriate direction.

Secured to the outer surface of the spool 10 at each quadrant are the disk shaped magnets 16. The magnets 16 are secured with an appropriate adhesive. It is to be appreciated that more or less magnets 16 can be used as desired. The present positioning of the magnets 16 however permits the alignment of the metallic body portion or shaft of the flag arm 20 with single or multiple magnets 16 and whereby the retention force of the arm 20 to the spool 10 can be varied. A variable retention force is desired to accommodate wind conditions or where large bait fish (i.e. minnows) are used and under which conditions the flag 14 might be falsely released. Wind conditions can also be partially offset by appropriately positioning the assembly 2 to an in-line relationship with the wind.

Also, more apparent from FIG. 3 are the construction and mounting of the various components of the assembly 2. In that regard, the couplers assembly 27, which secures the annunciator assembly 22 to the base 6, includes a pair of mating VELCRO pads 62 which permit the positioning of an electrical contact plate 64 relative to the flag arm 20. The annunciator assembly 22 is thereby readily detached or re-attached and positioned in relation to the flag arm 20 to facilitate operation. That is, with the release of the flag arm 20, the flag arm 20 strikes the contact plate 64 or looped contacts 25 to complete an electrical circuit which includes the lamp 24.

A peg 66 which projects from the base 6, otherwise, receives the spiral wound end 68 of the flag arm 20. An appropriately colored opaque or reflective flag 14 is secured to the uppermost end of the arm 20. The flag arm 20 can be detached from the peg 66 by merely rotating the arm 20. Reflective spots 18 may also be secured to the spool 10. In lieu of the cavity 59 and beads 60 or in addition thereto, a separate battery cavity (not shown) might also be provided at the spool 10 to support one or more light emitting diodes 69. Rotation of the spool is thus visible either via the spots 18 of FIG. 1 or the diodes 69, regardless of the time of day.

The base 6 is molded to include the pair of hinge standoffs 38 which rise from the upper surface of the base 6. The bottom of the base 6 otherwise includes a number of annular or radial webs 70 which radiate from the center hole 30. The numbers and spacing of the webs 70 are sized to provide stability and strength to the base 6.

The hinge standoffs 38 rise above the base 6 approximately two to three inches or to a height sufficient to accommodate the thickness of the spool 10. Each projection includes a recess or cavity 46 which is formed to receive the mating projections 44 that extend from the ends of the arm 8. A stop surface 72 formed into each end of the arm 8 mates with a surface 73 at the projection 38 to limit rotation of the arm 8. A latch might also be provided to secure the arm 8 to the standoff 38. Split hinge pins 42 secure the standoffs 38 and arm projections 44 to one another.

Figure 4:
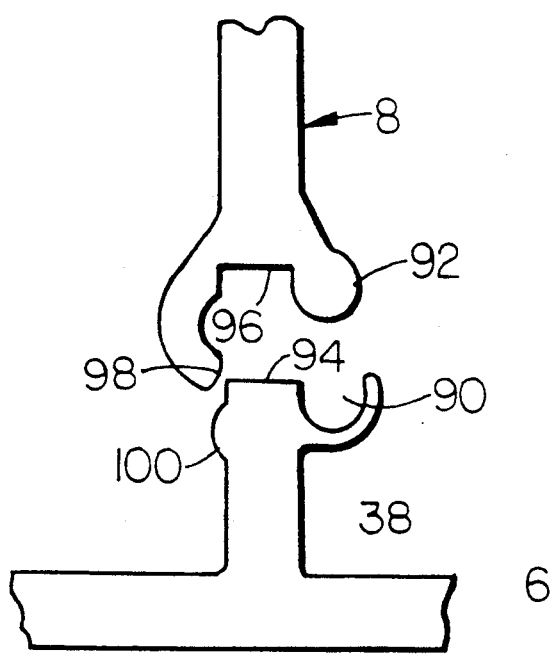
FIG. 4 is an elevation drawing of an alternative hinge assembly.

Another considered configuration of the hinge assembly 40, which is shown in an elevation view at FIG. 4, provides a standoff 38 having a U-shaped cavity 90, which mates with an opposite ball-shaped projection 92 that extends from the arm 8 and snap mounts within the U-shaped cavity 90. Cooperating surfaces 94, 96 at the respective ends of the standoff 39 and arm 8 mate with one another when the arm 8 is rotated full upright. A lower edge 98 of the arm otherwise cooperates with a rounded projection 100 at the standoff 38 to limit rotation of the arm 8 relative to the base 6. It is to be appreciated that still other snap mounting hinge constructions might suggest themselves to those skilled in the art.

Formed along the length of the arm 8 is a standoff 73 having an aperture 74 wherethrough a threaded fastener 76 extends to receive and offset the spool 10 from the arm 8. Mounted intermediate the arm 8 and spool 10 are multiple spring washers 78, and/or a spring 80 mounted between a pair of washers 78, which spring bias the spool 10 against an external washer 78 and a wing or hand nut 82, such as a wing nut. By appropriately adjusting the hand nut 82, varying degrees of tension can be applied to the spool 10. Line tension is otherwise also applied via the magnetic coupling between the flag arm 20 and magnets 16. The user is thus able to adjust the line tension as desired to the fishing conditions.

In lieu of a separately attached annunciator assembly 22, a battery and speaker containing cavity 83 (shown in cutaway at FIG. 3) may be formed in the rear hollow surface of the arm 8. Provided holes 84 align with a speaker (not shown), while the lamp 24 projects from the arm 8. An appropriate electrical circuit is again provided that upon actuation completes a circuit with the release of the flag arm 20 or rotation of the reel. Intermittent flashing might be provided if the magnets are aligned with a reel contact switch provided in the arm.

While the invention has been described with respect to various presently considered constructions, improvements and modifications thereto, it is to be appreciated still other constructions may suggest themselves to those skilled in the art. Accordingly, the following claims should be interpreted to include all of those equivalent embodiments within the spirit and scope thereof.

What is claimed is:
1. Fishing apparatus comprising:
a) a support base sized to cover a fish hole and including first and second vertical standoffs and a hole extending through said base;
b) a support arm and means for pivotally securing said support arm to said first and second standoffs to rotate between first and second mounting positions;
c) a spool containing a length of fish line and means for securing said spool to said arm to rotate about a pivot axle and wherein said spool includes a magnet secured to a portion thereof; and d) annunciator means including a portion coupling to said magnet for indicating a fish bite upon the rotation of said spool and a disengagement of the coupling portion from the magnet.

2. Apparatus as set forth in claim 1 wherein said base includes a through slot extending from a peripheral edge of said base to said hole.

3. Apparatus as set forth in claim 1 wherein each of said first and second standoffs includes a cavity and said support arm includes first and second projections which mount within the respective cavities and wherein apertures extend through said cavities and projections and mate with first and second hinge pins.

4. Apparatus as set forth in claim 3 including stop means for limiting the rotation of said support arm relative to said first and second projections.

5. Apparatus as set forth in claim 4 including means for maintaining the support arm at one of the first and second mounting positions.

6. Apparatus as set forth in claim 1 wherein said support arm includes a handhold portion.

7. Apparatus as set forth in claim 1 wherein said support arm comprises an arch shape and defines a handhold aperture between a lower surface of the arm and the base and wherein said spool includes a finger depression in one surface whereby the spool may be manually rotated.

8. Apparatus as set forth in claim 7 wherein said annunciator means includes a flag and a resilient flag support arm and wherein said flag support arm couples to said magnet, such that upon disengagement said flag support arm is biased to a bite indicating position.

9. Apparatus as set forth in claim 8 wherein said annunciator means includes lamp means electrically coupled to said flag support arm for illuminating upon disengagement of said flag support arm.

10. Apparatus as set forth in claim 8 wherein said annunciator means further includes audible means electrically coupled to said flag support arm for audibly signaling a fish bite upon disengagement of said flag support arm.

11. Apparatus as set forth in claim 8 wherein said annunciator means includes means for selectively positioning an electrical contact portion of said annunciator means to said base and relative to the flag support arm.

12. Apparatus as set forth in claim 1 including means appended to said base for supporting fishing accessory items to said base.

13. Apparatus as set forth in claim 1 wherein the spool pivot axle includes a threaded portion and further including means cooperating with said threaded portion for varying the rotational tension of said spool relative to the support arm.

14. Apparatus as set forth in claim 13 including a line guide projecting from the support arm and having a bore receiving a fishing line directed therethrough.

15. Apparatus as set forth in claim 14 wherein said base includes an open ended storage compartment projecting from an upper surface and having a cover.

16. Fishing apparatus comprising:
a) a support base including first and second vertical standoffs and a hole extending through said base;
b) an arcuate support arm defining a handhold aperture between a lower surface of the arm and the base and means for pivotally securing said support arm to said first and second standoffs to rotate between first and second mounting positions;
c) a spool containing a length of fish line and means for securing said spool to said arm to rotate about a pivot axle under a selected tension, wherein said spool includes a cavity containing a plurality of beads, a plurality of magnets secured to an exposed surface thereof and a finger depression in the exposed surface whereby the spool may be manually rotated; and
d) a line guide projecting from the support arm and having a bore wherethrough the fishing line is directed;
e) annunciator means including a flag and a resilient flag support arm and wherein said flag support arm couples to ones of said plurality of magnets such that upon the rotation of said spool and the disengagement of said flag support arm, the flag support arm is biased to a bite indicating position.

17. Fishing apparatus comprising:
a) a support base including a hole extending through said base;
b) an arcuate support arm defining a handhold aperture between a lower surface of the arm and the base and means for pivotally securing said support arm to said base to rotate between first and second mounting positions;
c) a spool containing a length of fish line and means for securing said spool to said support arm to rotate under a selected tension and wherein said spool includes a magnet secured to a portion thereof;
d) a line guide projecting from the support arm and having a bore wherethrough the fishing line is directed; and
e) annunciator means including a portion coupling to said magnet for indicating a fish bite upon the rotation of said spool and the disengagement of the coupling portion from the magnet.

* * * * *